United States Patent [19]
Patel et al.

[11] Patent Number: 6,142,506
[45] Date of Patent: Nov. 7, 2000

[54] ENERGY ABSORBING VEHICLE TRIM WITH AIRBAG

[75] Inventors: Rasik Patel, Canton; Lee Avrial Walker, Shelby Township, both of Mich.

[73] Assignee: Ford Global Technologies, Inc., Dearborn, Mich.

[21] Appl. No.: 09/152,901

[22] Filed: Sep. 14, 1998

[51] Int. Cl.[7] .................................................. B60R 21/16
[52] U.S. Cl. ................................... 280/728.2; 280/730.2; 296/189
[58] Field of Search .............................. 280/730.2, 730.1, 280/728.2, 728.3, 751, 748; 296/189, 39.1, 203.03; 188/371; 52/716.7

[56] References Cited

U.S. PATENT DOCUMENTS

| | | |
|---|---|---|
| 2,360,717 | 10/1944 | Onishi et al. . |
| 2,664,308 | 12/1953 | Appel . |
| 2,687,326 | 8/1954 | Vahey . |
| 3,642,560 | 2/1972 | Marsh, Jr. et al. . |
| 4,088,364 | 5/1978 | Termont . |
| 4,332,187 | 6/1982 | Imai et al. . |
| 5,265,903 | 11/1993 | Kuretake et al. . |
| 5,375,876 | 12/1994 | Bauer et al. . |
| 5,419,583 | 5/1995 | Sakakida et al. ..................... 280/728.2 |
| 5,462,308 | 10/1995 | Seki et al. . |
| 5,490,691 | 2/1996 | Sinnhuber et al. . |
| 5,533,746 | 7/1996 | Whited ................................. 280/728.2 |
| 5,540,459 | 7/1996 | Daniel . |
| 5,580,116 | 12/1996 | Patel et al. . |
| 5,605,346 | 2/1997 | Cheung et al. . |
| 5,836,641 | 11/1998 | Sugamoto et al. ....................... 296/189 |
| 5,941,558 | 8/1999 | Labrie et al. ......................... 280/728.3 |
| 5,988,673 | 11/1999 | Stavermann .......................... 280/730.1 |

FOREIGN PATENT DOCUMENTS

| | | |
|---|---|---|
| 27 35 531 A1 | 2/1979 | Germany . |
| 60-197123 | 10/1985 | Japan . |
| 61-193920 | 8/1986 | Japan . |
| 4-166451 | 6/1992 | Japan . |
| 6/227340 | 8/1994 | Japan . |
| 2191450 | 6/1986 | United Kingdom . |

Primary Examiner—Lanna Mai
Assistant Examiner—Lynda Jasmin
Attorney, Agent, or Firm—David B. Kelley

[57] ABSTRACT

A vehicle trim system for an automotive vehicle with a side airbag provides energy absorption for conditions not requiring side airbag deployment. The system has an inflatable restraint mounted on an interior facing surface of an interior body structure, such as an A-pillar or roof rail, and an energy absorbing member spaceably mounted therefrom defining a first cavity having a first section containing the inflatable restraint and a second section spaced from an innermost surface of the vehicle body structure. A trim piece is spaceably mounted to the energy absorbing member and cooperative therewith to move from a covering position covering the inflatable restraint when in an uninflated state to a deployed position so as to partially deflect from the vehicle body structure to allow the inflatable restraint to inflate along the surfaces adjacent the vehicle body structure.

18 Claims, 7 Drawing Sheets

ENERGY ABSORBING VEHICLE TRIM WITH AIRBAG

FIELD OF THE INVENTION

The present invention generally relates to automotive vehicle inflatable occupant restraints, and, more particularly, to such restraints deployed on vehicle sides.

BACKGROUND OF THE INVENTION

The use of inflatable occupant restraints, or airbags, in automotive vehicles has become common in the industry. Inflatable occupant restraint systems have long been available to respond to frontal impacts, and, more currently, side airbags, have been developed for absorbing energy due to excessive lateral loading of vehicles.

A particular challenge in developing side airbag systems is packaging the system, which typically includes an airbag module, within limited structure along the side of the vehicle, particularly the roof rail and pillars. Various approaches have been taken to accomplish this packaging task, such as U.S. Pat. No. 5,605,346 (Cheung et al.) for a side mounted airbag module, and U.S. Pat. No. 5,265,903 (Kuretake et al.) for a device protecting the head of an occupant. These designs, however, may not provide sufficient energy absorption for side impacts or other conditions which do not initiate airbag deployment.

SUMMARY OF THE INVENTION

The present invention addresses this condition by providing an energy absorbing occupant restraint system for an automotive vehicle with a vehicle body structure having an interior facing surface, the system comprising an inflatable restraint adapted to be mounted on the interior facing surface, an energy absorbing member spaceably mounted from the vehicle body structure so as to define a first cavity having a first section containing the inflatable restraint and a second section spaced from an innermost surface of the vehicle body structure and a trim piece spaceably mounted to the energy absorbing member and cooperative therewith to move from a covering position covering the inflatable restraint when in an uninflated state to a deployed position so as to partially deflect from the vehicle body structure to allow the inflatable restraint to inflate along the surfaces adjacent the vehicle body structure.

An advantage of the present invention is a vehicle trim system with an airbag which provides energy absorption for conditions not requiring side airbag deployment.

BRIEF DESCRIPTION OF THE DRAWINGS

These and other objects, advantages, and features of the present invention will be apparent to those skilled in the arts upon reading the following description with reference to the accompanying drawings, in which.

DETAILED DESCRIPTION OF THE PREFERRED EMBODIMENTS

Figure 1:
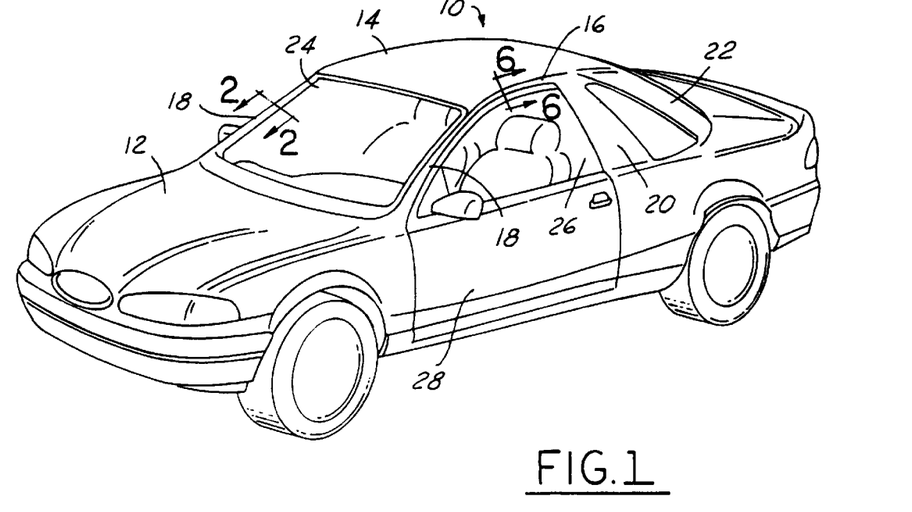
FIG. 1 is a perspective view of an automotive vehicle having an energy absorbing vehicle trim with airbag according to the present invention.

Turning now to the drawings, and in particular to FIG. 1 thereof, an automotive vehicle 10 is illustrated as including a body 12 and a roof 14 which has roof rails 16 (only one shown) along an outer edge thereof. The roof 14 is supported by a plurality of pillars, including A-pillars 18, B-pillars 20 (only one shown), and C-pillars 22 (only one shown). While the present invention will be described with respect to the A-pillars 18, those skilled in the art will recognize that it may be used with other pillar structures, including B-pillars and C-pillars. Between the A-pillars 18 is fixedly secured a windshield 24, and between the A-pillar and B-pillar on each side of vehicle 10 is a window 26 mounted in a door 28.

Figure 2:
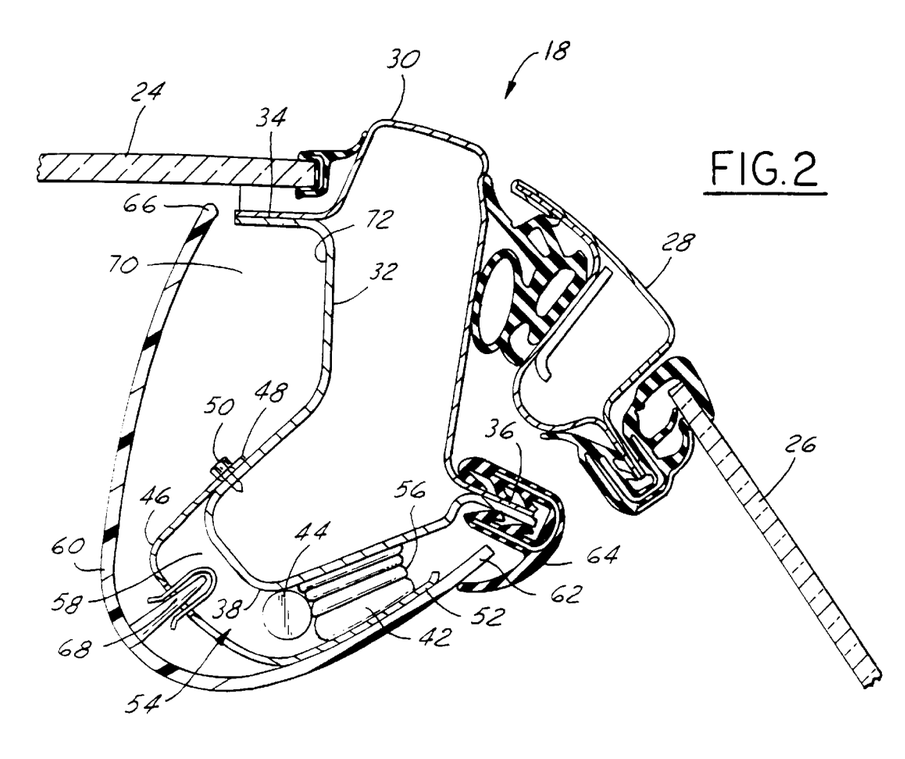
FIG. 2 is a cross-sectional view taken along line 2—2 of FIG. 1.

Turning now to FIG. 2, the A-pillar 18 is illustrated as comprising an outer panel 30 and an inner panel 32 which are preferably conventionally secured together as by welding, at flanges 34, 36. The outer panel 30 is configured to be concave inward, and the inner panel 32 is concave outward to define a chamber therebetween. Mounted on an innermost surface 38 of the inner panel 32 is an inflatable restraint, or airbag module, which is comprised of an inflatable airbag 42 and a gas generator 44, as conventionally used. Other airbag modules known to those skilled in the art may also be used.

Spaceably mounted from the inner panel 32 is an energy absorbing member, for example a thin metal sheet 46 having an attachment end 48 secured to the inner panel 32, for example by a screw 50, and a second, free end 52 overlapping the airbag module (FIG. 2). The metal sheet 46 is spaced from the inner panel 32 so as to define a first cavity 54 having a first section 56 containing the airbag module and a second section 58 spaced from the innermost surface 38 of the inner panel 32. The second section 58 is positioned so as to absorb energy directed at the pillar 18 from within the passenger compartment of the vehicle 10, particularly when the airbag module 40 is in an uninflated state, as seen in FIG. 2.

Still referring to FIG. 2, a trim piece 60 is spaceably mounted to the metal sheet 46 and has a leading edge 62 cooperative with a seal 64 and a trailing edge 66 adjacent the windshield 24 so as to substantially encase the metal sheet 46. The trim piece 60 may be attached to the metal sheet 46 by an energy absorbing attachment 68 adjacent the innermost surface 38 of the inner panel 32. A second cavity 70 is defined between a windshield adjacent surface 72 of the inner panel 32 and the trim piece 60 adjacent the trailing edge 66.

Figure 3:
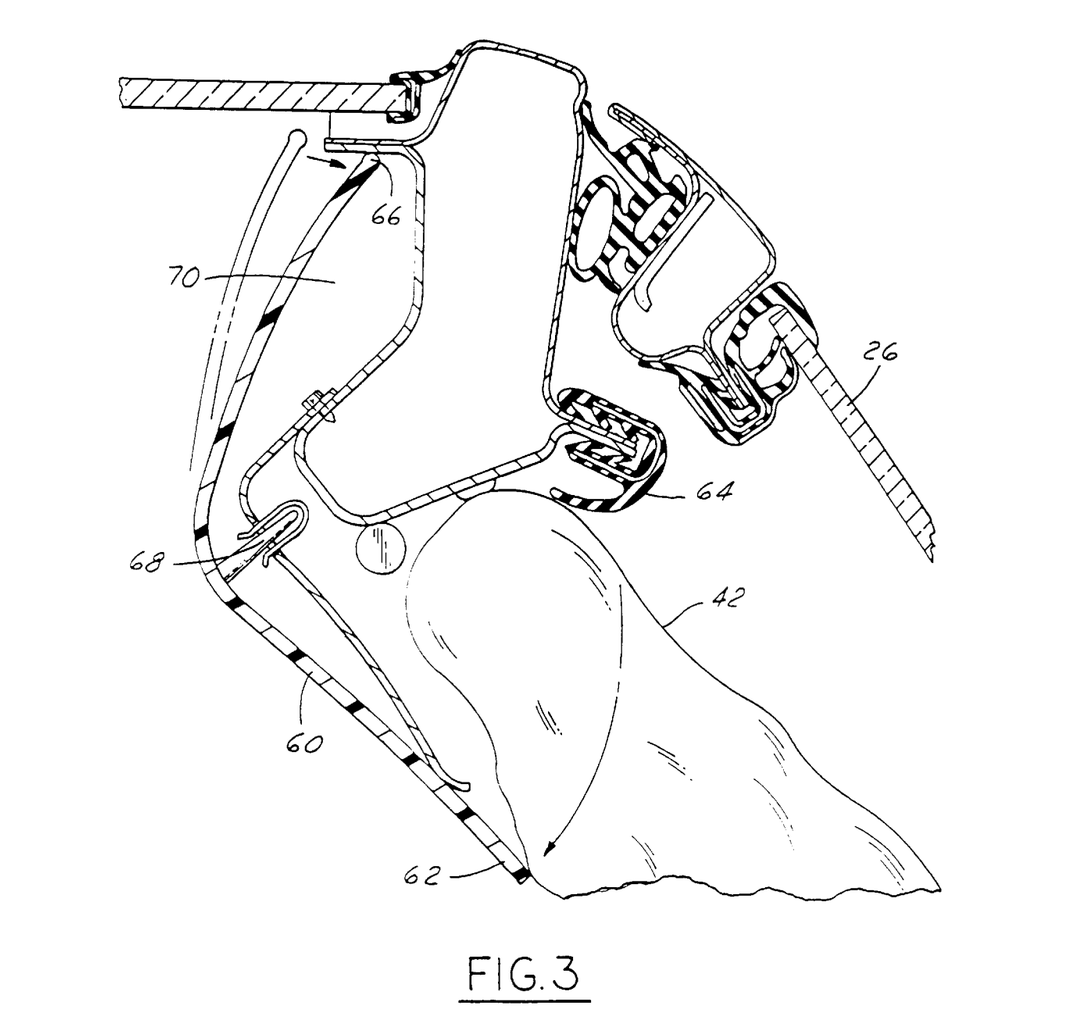
FIG. 3 is a cross-sectional view similar to FIG. 2 but showing the energy absorbing vehicle trim deployed by virtue of airbag inflation.

Inflation of the airbag 42 to an inflated state (FIG. 3) causes the metal sheet 46 and the trim piece 60 attached thereto, to cooperatively move from a covering position (FIG. 2) to a deployed position in which the leading edge 62 disengages from the body seal 64 so as to partially deflect from the pillar 18 to allow the airbag 42 to inflate along the window 26. Concurrently, the trailing edge 66 moves into the second cavity 70 so as to produce flexure energy in the trim piece 60 caused by rotation about the attachment 68. Excess flexure energy in trim piece 60 may cause undesirable breakage or fragmentation thereof.

Figure 4:
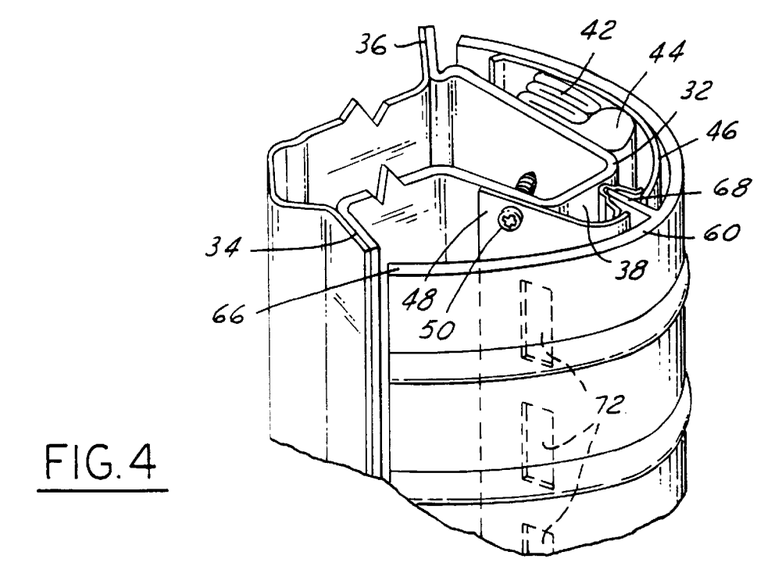
FIG. 4 is a perspective partial view of an energy absorbing vehicle trim system with an airbag according to an alternate embodiment of the present invention shown with the airbag in an uninflated state.
Figure 5:
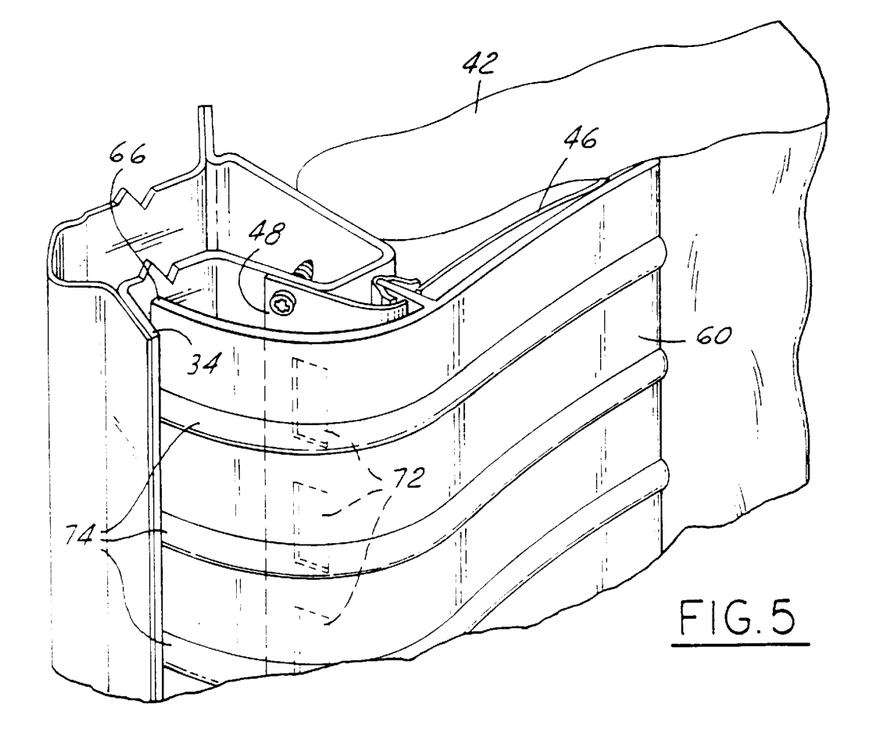
FIG. 5 is a perspective partial view similar to FIG. 4 but showing the airbag in an inflated state.

Turning now to FIGS. 4 and 5, an alternative embodiment of the present invention as employed an A-pillar is illustrated in undeployed and deployed positions, respectively. The metal sheet member 46 has a plurality of weakened sections 72 along the attachment edge 48 to facilitate rotation of the metal sheet member and the trim piece 60 thereabout upon inflation of the inflatable restraint. Preferably, the weakened section 72 are vertically staggered holes and may be rectangular, square, round or many other shapes so long as the metal sheet member 46 is weakened thereby along the attachment edge 48.

To further facilitate energy absorption of the trim piece 60, a set of horizontally spaced ribs may be integrally formed therewith (FIGS. 4 and 5). The ribs 74 may be located either on an inner surface facing the metal sheet member 46, or may be on an opposite surface, as shown.

Figure 6:
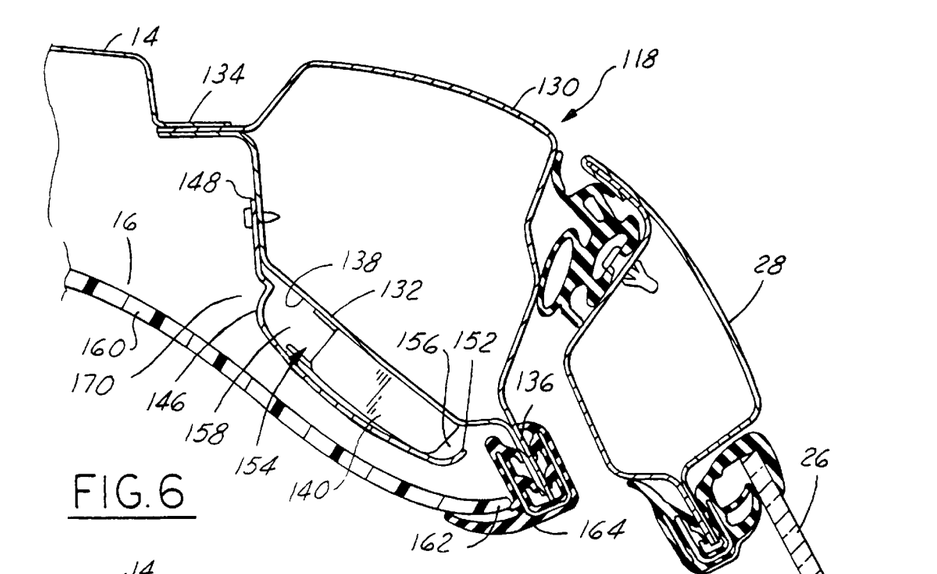
FIG. 6 is a cross-sectional view taken along line 6—6 of FIG. 1 showing an energy absorbing vehicle trim system mounted along a roof rail with an airbag in an uninflated state.
Figure 7:
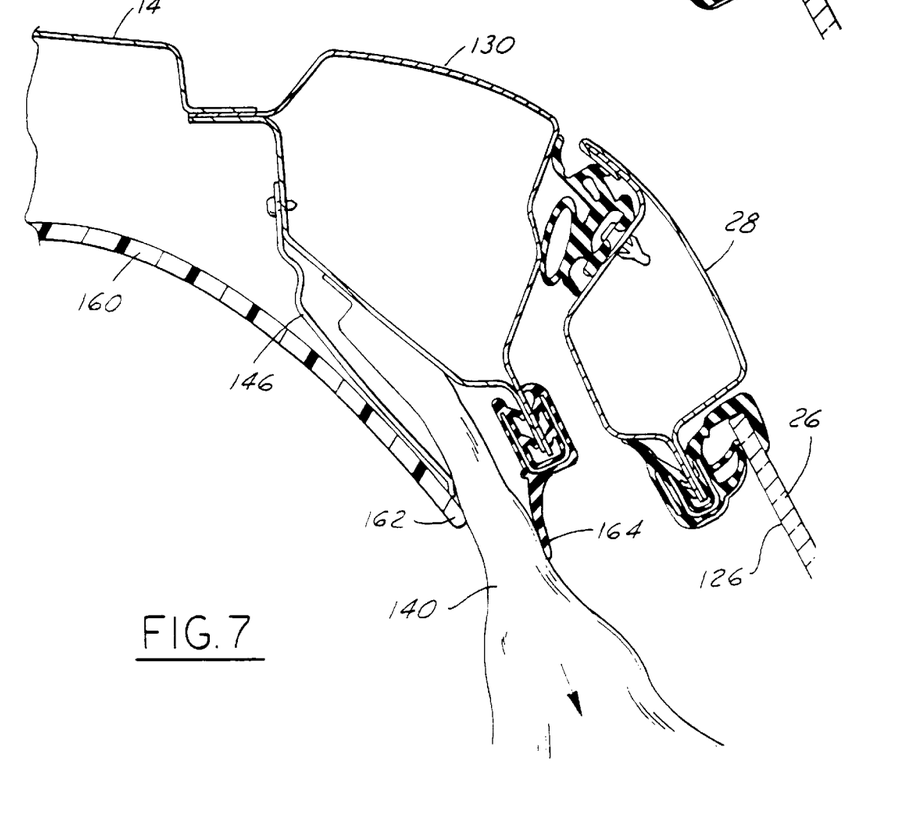
FIG. 7 is a cross-sectional view similar to FIG. 6 but showing the airbag in an inflated state deploying the trim system.

FIGS. 6 and 7 show implementation of the present invention in a roof rail of vehicle 10. The airbag module 140 is mounted on an innermost surface 138 of roof rail 118, which is composed of an outer roof panel 130 and an inner roof panel 132, which are connected at flanges 134 and 136. A metal sheet member 146 is attached to the innermost surface 138 along an attachment edge 148 and extends over the airbag module 140 to a free edge 152. The metal sheet member 146 in the configuration described thus defines a first cavity 154 having a first section 156 containing the airbag module 140 and a second section 158 spaced from the innermost surface 138. A headliner 160 is spaceably mounted to the roof 14 in a fashion known to those skilled in the art and extends substantially under the roof 14 in the interior of the vehicle 10 and has a leading edge 162 cooperative with a body seal 164 so as to create a second cavity 170 (FIG. 6) for absorption of impact energy thereon. The headliner 160 is cooperative with the energy absorbing member 146 to move from a covering position covering the airbag module 140 when in an uninflated state (FIG. 6) to a deployed position in which the leading edge 162 disengages from the body seal 164 so as to partially deflect from the roof rail 118 to allow the airbag 142 to inflate along surfaces adjacent thereto, including an inner surface 126 of the window 26 (FIG. 7). As described above, the energy absorbing member 146 may have weakened sections along the attachment edge 148, and the headliner 160 may have energy absorbing ribs, preferably on an inner surface 161, which may extend laterally, longitudinally, or both.

Figure 8A:
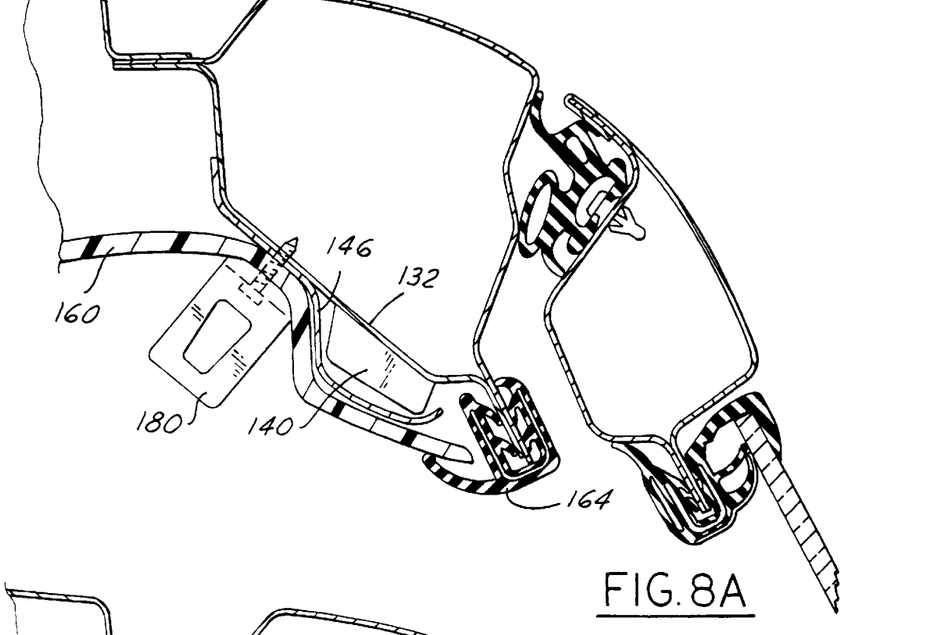
FIGS. 8A and 8B are cross-sectional views similar to FIG. 6 but showing an energy absorbing vehicle trim system according to the present invention with trim packaging for a garment hook and a second embodiment, respectively.

A garment ring 180 may be attached to the headliner 160, the energy absorbing member 146, and into the inner panel 132 of the roof rail 118 in a manner as shown in FIG. 8A without interfering with airbag 140 deployment. This is accomplished by mounting the airbag 140 to the inner panel 132 between the garment hook 180 and the seal 164. Other interior headliner appurtenances may be attached in similar fashion, for example, a passenger grab handle (not shown).

Figure 8B:
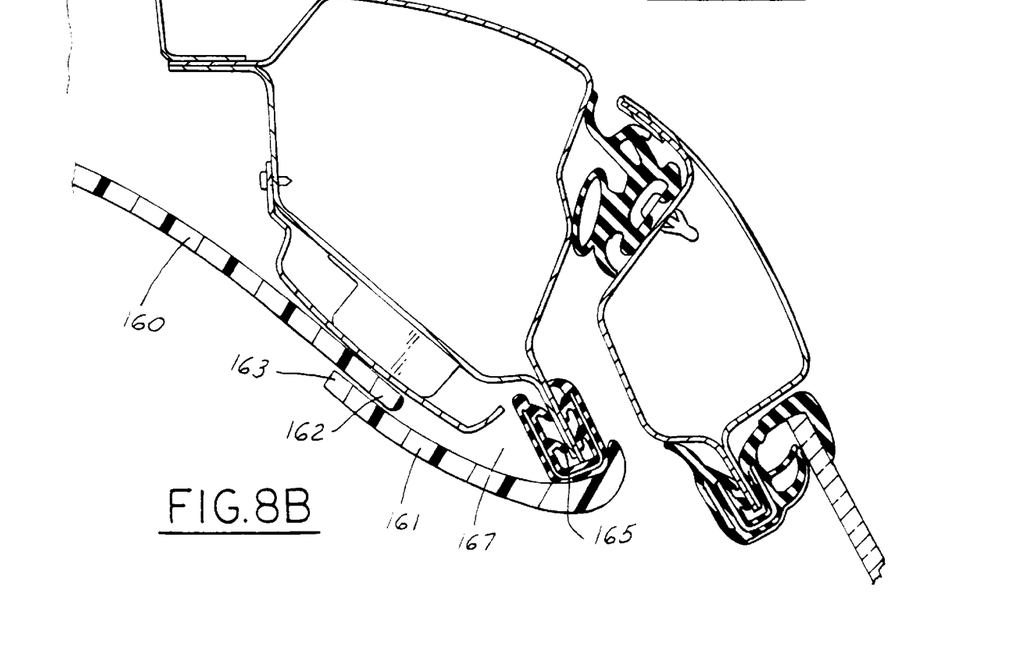

A second embodiment of the headliner application of the present invention is shown in FIG. 8B. The headliner 160 is positioned adjacent the energy absorbing member 146 with the leading edge 162 under a leading edge 163 of a headliner trim piece 161. The headliner trim piece 161 is attached to a body seal 165 and forms pocket 167 for absorbing energy in conditions not requiring inflation of the airbag 140. Upon airbag 140 inflation, the energy absorbing member 146 and headliner 160 are pushed away from the A-pillar, in a fashion similar to that shown in FIG. 7, simultaneously pushing the leading edge 163 of the headliner trim piece 161 outwardly from the pocket 167 in rotational fashion about the body seal 165 (not shown).

Figure 9:
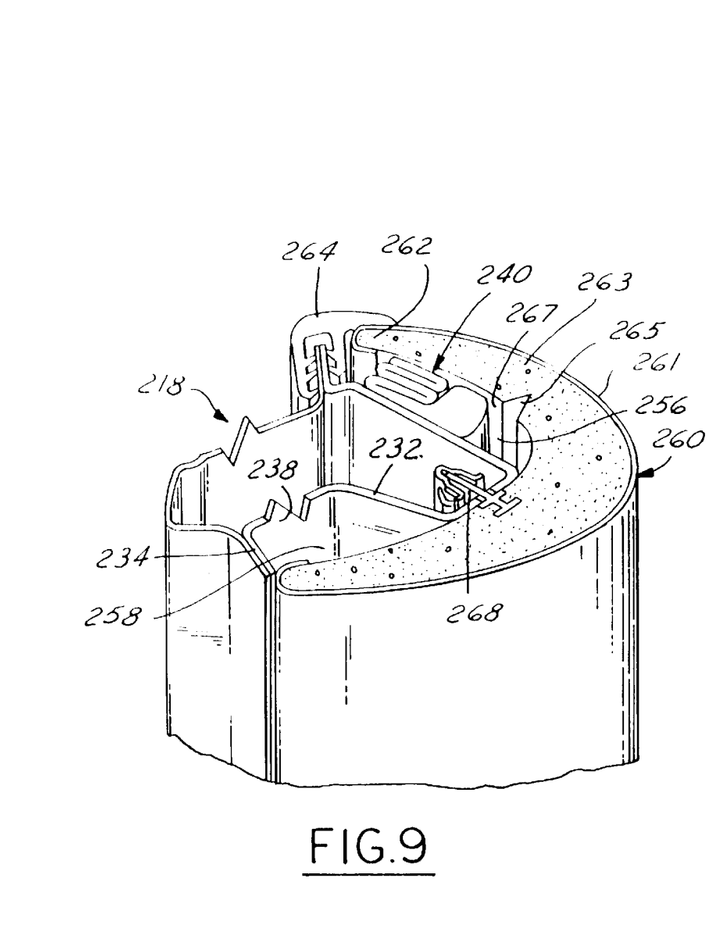
FIGS. 9 and 10 show an energy absorbing vehicle trim system according to a third embodiment of the present invention with an airbag in an uninflated and an inflated state, respectively.
Figure 10:
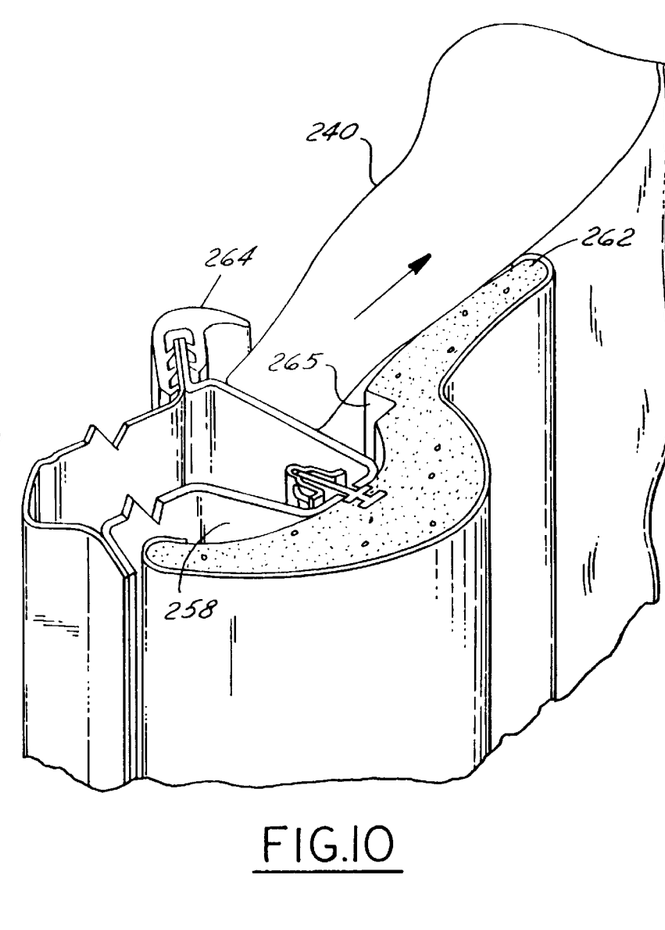

FIGS. 9 and 10 show a third embodiment of the vehicle energy absorbing trim with airbag in undeployed and deployed states, respectively, over a vehicle A-pillar. The trim piece 260, which preferably has a hard outer skin 261, for example, made of plastic, and a softer inner portion, 263, for example made of foam, attached to the inner panel 232, for example with an energy absorbing fastener 268, thus creating a first section 256 in which the airbag module 240 is mounted to the A-pillar 18 and a second section 258 spaced from the innermost surface 238 of the inner panel 232. The trim piece 260 has a leading edge 262 cooperative with a seal 264 and a trailing edge 266 adjacent a flange 234 (FIG. 9). A notch 262 is cut into an inner surface 267 of the foam 263 on an opposite side of the airbag module 240 from the leading edge 262 so as to facilitate disengagement of the leading edge 262 from the seal 264 during airbag 240 deployment, and the trailing edge 266 rotates into the second section 258 (FIG. 10).

Figure 11:
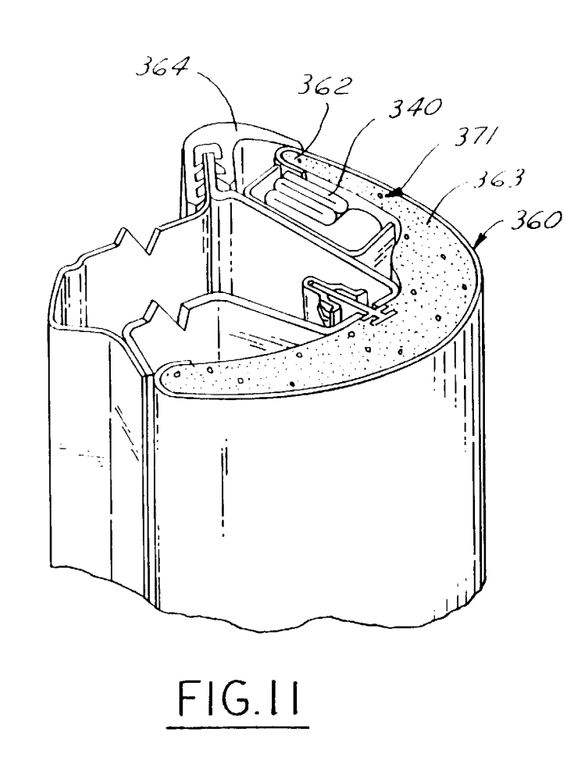
FIGS. 11 and 12 are partial perspective views similar to FIGS. 9 and 10, respectively, showing a fourth embodiment of the present invention.
Figure 12:
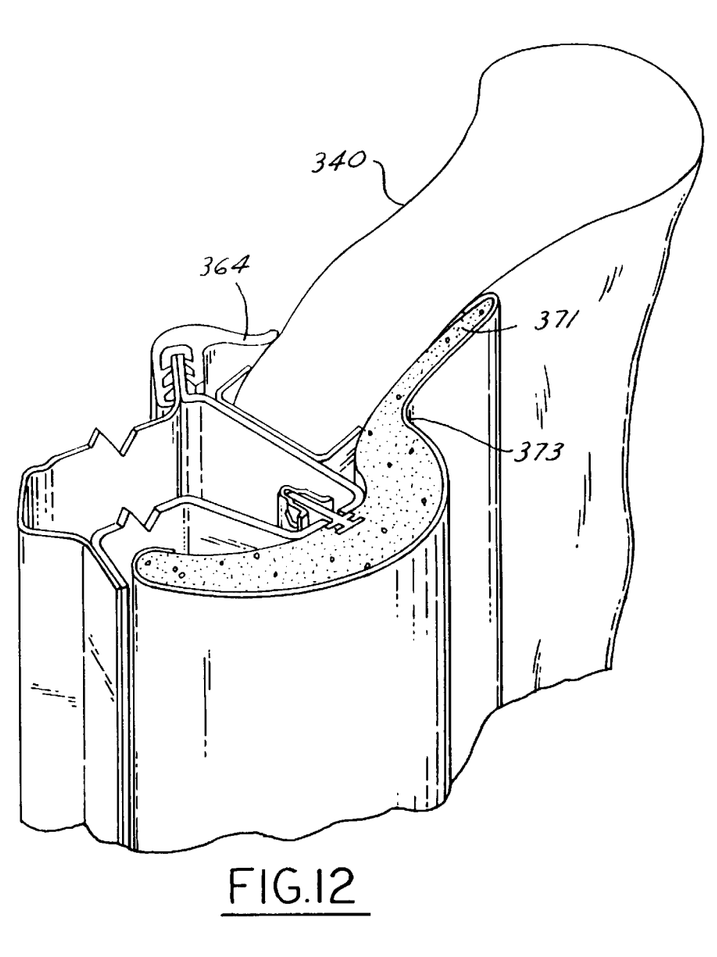

As seen in FIGS. 11 and 12, deployment of airbag 340 may be facilitated by a narrowed section 371 of the foam portion 363 of trim piece 360. The narrowed section 371 covers the airbag 340 (FIG. 11) and terminates in the leading edge 362, which cooperates with the seal 364. Upon airbag 340 deployment, the leading edge 362 disengages from the seal 364 allowing the narrowed section 371 to pivot about a pivot point 373 (FIG. 12). It should be noted that the narrowed section 371 of FIGS. 11 and 12 may be used in combination with the notch 265 of FIGS. 9 and 10.

Although the preferred embodiment of the present invention has been disclosed, various changes and modifications may be made without departing from the scope of the invention as set forth in the appended claims.

What is claimed is:

1. An energy absorbing occupant restraint system for an automotive vehicle with a vehicle body structure having an interior facing surface, the system comprising:

an inflatable restraint, adapted to be mounted on the interior facing surface of the vehicle body structure and having an uninflated state and an inflated state;

energy absorbing means for absorbing impact energy adapted to be spaceably mounted from the vehicle body structure so as to define a first cavity having a first section containing the inflatable restraint and a second section spaced from an innermost surface of the vehicle body structure; and a trim piece spaceably mounted to the energy absorbing means and cooperative with the energy absorbing means to move from a covering position covering the inflatable restraint when in the uninflated state to a deployed so as to partially deflect from the vehicle body structure to allow the inflatable restraint to inflate along surfaces adjacent to the vehicle body structure, wherein the trim piece has a trailing edge adjacent the vehicle body structure defining a second cavity between the trim piece and the vehicle body structure so that movement of the inflatable restraint to the inflated state rotates the energy absorbing means about an attachment point causing the trailing edge of the trim piece to rotate into the second cavity.

2. The system set forth in claim 1 wherein the energy absorbing means is a thin metal sheet with an attachment edge and a free edge.

3. The system as set forth in claim 2, wherein the energy absorbing means contains weakened sections along the attachment edge thereof to assist in rotation thereabout upon inflation of the inflatable restraint.

4. The system as set forth in claim 3, wherein the weakened sections are vertically staggered holes.

5. The system as set forth in claim 1, wherein the trim piece contains ribs to improve energy absorption.

6. The system as set forth in claim 5, wherein the ribs are horizontally spaced and integral with the trim piece.

7. A energy absorbing occupant restraint system for an automotive vehicle with a body pillar having an interior facing surface, the system comprising:

an inflatable restraint, adapted to be mounted on the interior facing surface of the body pillar and having an uninflated state and an inflated state;

a deformable metal sheet for absorbing energy directed toward the body pillar adapted to be spaceably mounted therefrom with an attachment edge mounted on a first side of the body pillar and having a free edge adjacent a second side of the body pillar so as to define a first cavity having a first section containing the inflatable restraint and a second section spaced from an innermost surface of the vehicle body structure; and a trim piece spaceably mounted to and substantially encasing the metal sheet and cooperative therewith to move from a covering position covering the inflatable restraint when in the uninflated state to a deployed position in which the leading edge disengages from at least one body seal so as to partially deflect from the body pillar to allow the inflatable restraint to inflate along a surface adjacent thereto.

8. The system as set forth in claim 7 wherein the trim piece has a trailing edge adjacent the vehicle body structure defining a second cavity between the trim piece and the vehicle body structure so that movement of the inflatable restraint to the inflated state rotates the thin metal sheet about an attachment point causing the trailing edge of the trim piece to rotate into the second cavity.

9. The system set forth in claim 7 wherein the thin metal sheet has an attachment edge and a free edge.

10. The system as set forth in claim 9, wherein the thin metal sheet contains weakened sections along the attachment edge thereof to assist in rotation thereabout upon inflation of the inflatable restraint.

11. The system as set forth in claim 10, wherein the weakened sections are vertically staggered holes.

12. The system as set forth in claim 7, wherein the trim piece contains ribs to improve energy absorption.

13. The system as set forth in claim 12, wherein the ribs are horizontally spaced and integral with the trim piece.

14. A deployable trim system for an automotive vehicle with an inflatable restraint mounted on an interior facing surface of a vehicle body structure and having an uninflated state and an inflated state; the system comprising:

an energy absorbing member adapted to be spaceably mounted from the vehicle structure with an attachment edge mounted on a first side of the vehicle structure and a free edge adapted to overlap the inflatable restraint adjacent a second side of the vehicle structure, the energy absorbing member defining a first cavity having a first section containing the inflatable restraint and a second section spaced from an innermost surface of the vehicle body structure; and a trim piece spaceably mounted to the energy absorbing member and having a leading edge cooperative with at least one body structure seal, the trim piece cooperative with the energy absorbing member to move from a covering position covering the inflatable restraint when in an uninflated state, to a deployed position in which the leading edge disengages from the body seals so as to partially deflect from the vehicle structure to allow the inflatable restraint to inflate along a surface adjacent thereto, wherein the trim piece has a trailing edge adjacent the vehicle body structure defining a second cavity between the trim piece and the vehicle body structure so that movement of the inflatable restraint to the inflated state rotates the energy absorbing member about an attachment point causing the trailing edge of the trim piece to rotate into the second cavity.

15. The system set forth in claim 14 wherein the energy absorbing member is a thin metal.

16. The system as set forth in claim 14, wherein the thin metal sheet contains weakened sections along the attachment edge thereof to assist in rotation thereabout upon inflation of the inflatable restraint.

17. The system as set forth in claim 16, wherein the weakened sections are vertically staggered holes.

18. The system as set forth in claim 14, wherein the trim piece contains horizontally spaced ribs to improve energy absorption.

* * * * *